United States Patent

Fujii et al.

[11] Patent Number: 6,138,810
[45] Date of Patent: Oct. 31, 2000

[54] METHOD FOR CONTROLLING A HYDRAULIC VALVE OF AN AUTOMATIC TRANSMISSION

[75] Inventors: Yuji Fujii; James William Loch McCallum, both of Ann Arbor; Marvin Paul Kraska, Dearborn, all of Mich.

[73] Assignee: Ford Global Technologies, Inc., Dearborn, Mich.

[21] Appl. No.: 09/368,218

[22] Filed: Aug. 4, 1999

[51] Int. Cl.[7] ................................................ F16D 25/00
[52] U.S. Cl. ................................. 192/85 R; 192/109 F
[58] Field of Search ............................ 192/85 R, 109 F; 251/31, 65, 129.06

[56] References Cited

U.S. PATENT DOCUMENTS

| | | | |
|---|---|---|---|
| 4,116,321 | 9/1978 | Miller | 192/109 F X |
| 4,617,968 | 10/1986 | Hendrixon . | |
| 4,942,787 | 7/1990 | Aoki et al. | 192/109 F X |
| 4,962,831 | 10/1990 | Dundas . | |
| 5,002,090 | 3/1991 | Ichikawa et al. . | |
| 5,240,041 | 8/1993 | Garnjost . | |
| 5,244,002 | 9/1993 | Frederick . | |
| 5,722,459 | 3/1998 | Kim et al. . | |
| 5,787,915 | 8/1998 | Byers et al. . | |
| 5,826,616 | 10/1998 | Golden . | |
| 5,957,260 | 9/1999 | Kunii | 192/85 R |

*Primary Examiner*—Richard M. Lorence
*Assistant Examiner*—Saúl J. Rodriguez
*Attorney, Agent, or Firm*—Frank G. McKenzie

[57] ABSTRACT

A method for controlling operation of a hydraulic valve having a magnet fixed to a displaceable spool, a sensor producing a signal responsive to the sensed intensity of a field produced by the magnet representing the position of the spool in the valve spool, the method comprising producing from the signal a time series record of the position of the spool; determining the desired position of the spool, producing a error signal from the difference between actual and desired spool position, determining a compensated correction error, producing a commanded control pressure signal to change the magnitude of control pressure supplied to the valve, and changing the position of the spool in response to the control pressure signal.

7 Claims, 3 Drawing Sheets

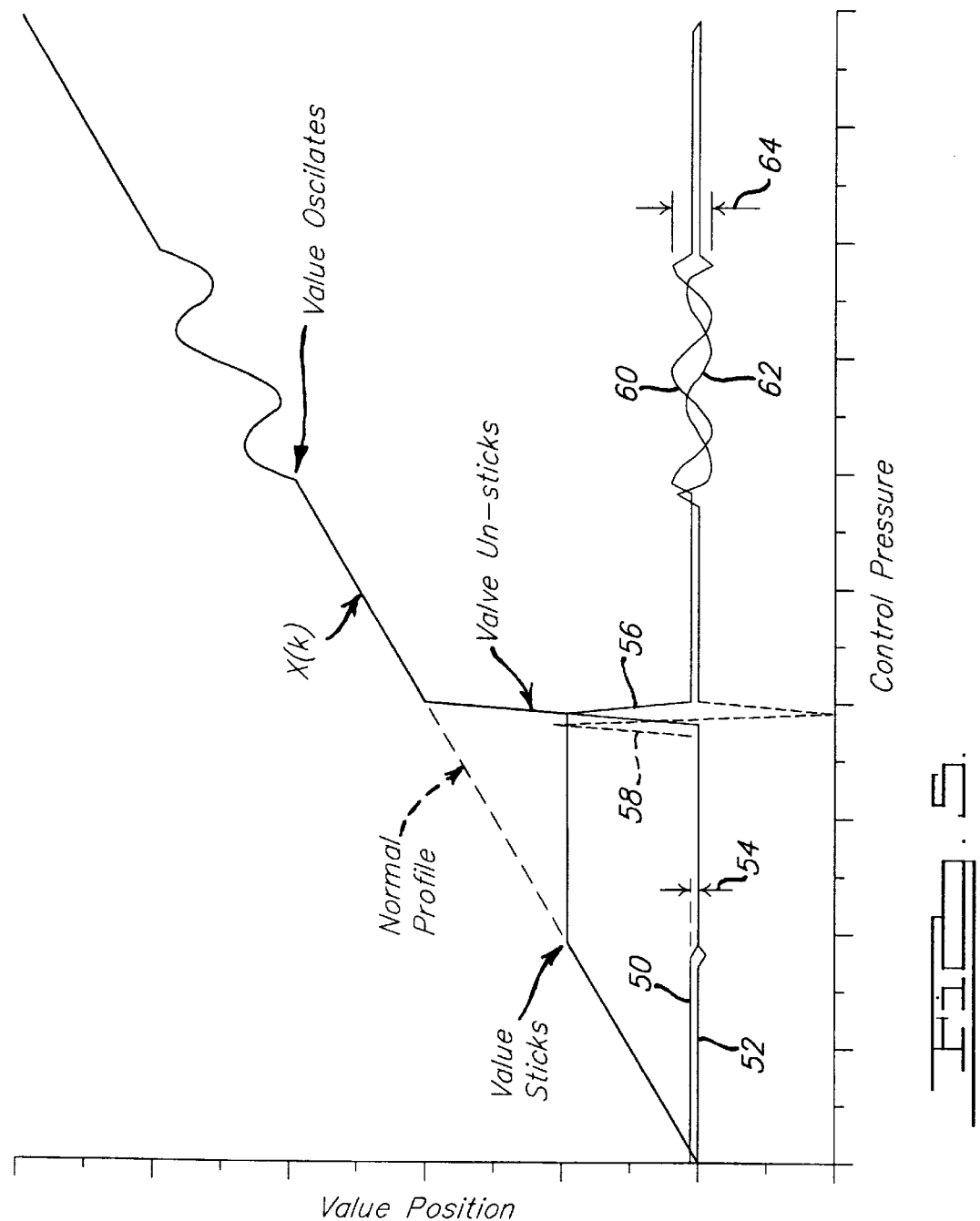

METHOD FOR CONTROLLING A HYDRAULIC VALVE OF AN AUTOMATIC TRANSMISSION

BACKGROUND OF THE INVENTION

1. Field of the Invention

This invention relates to the field of hydraulic systems, more particularly it pertains to control of valves used in such systems to operate an automatic transmission for motor vehicles.

2. Description of the Prior Art

A gear ratio change in a conventional automatic transmission is accomplished by applying or releasing a friction element (a brake or clutch) that changes the speed and torque relationship by means of planetary gearsets. Friction elements are hydraulically controlled by pressure regulator valves and flow regulator (shift control) valves. Pressure regulator valves control hydraulic pressure, which determines friction element torque capacity. Flow regulator valves, which control a flow rate of pressurized oil into a friction element, determines the time rate of friction element torque capacity change.

A continuously variable transmission (CVT) uses a special variator to change the speed and torque relationship continuously. Variators are hydraulically controlled by pressure regulator valves and flow regulator valves. Pressure regulator valves control hydraulic pressure, which determines the variator torque capacity. Flow regulator valves, which control the flow rate of fluid into variator pistons, determines the rate of speed ratio change. In both conventional automatic transmissions and CVTs, precise control of the valve motion is vital to providing and maintaining good shift quality and durability.

Conventional automatic transmission systems do not monitor motion of pressure and flow regulator valves. oscillatory motion of pressure regulator valves can cause undesirable hydraulic pressure oscillation, which can degrade shift quality. Also, it can potentially emit audible noise. Conventional flow regulator valves may include a fixed flow control geometry called "notches". This passive method may not perform optimally in all situations. Unit-to-unit variations and component degradation of pressure and flow regulator valves over the life of the transmission may cause shift quality degradation with the conventional approach.

SUMMARY OF THE INVENTION

Valve position is determined by a combination including magnet fixed to a valve spool and a sensor that produces a signal representing the spool position derived from the intensity of the magnetic field produced by magnet on the spool. Valve velocity and acceleration are computed from a time series of valve spool position signals. By this method, a signal is available representing the full range of valve position within the bore. When the technique method is applied to a pressure regulator valve, it provides a signal used to reduce hydraulic pressure oscillation.

Valve oscillation which causes pressure oscillation can be actively controlled through feedback of valve position and velocity. When it is applied to a flow regulator valve, it overcomes the uncertainty of flow control. The valve opening, which determines oil flow rate into the friction element piston or CVT variator pistons, can be actively controlled through feedback of valve position and velocity.

Motion characteristics of both pressure and flow regulator valves are affected by unit-unit variation as well as operating conditions such as oil temperature. Component wear and degradation of lubrication fluid can affect the valve motion over the life of the system. The feedback control allows the automatic transmission system to maintain a good shift quality over the life of the system. In addition, monitoring valve motion over the life of the transmission gives an indication of potential valve malfunction due to excessive material wear or debris particles in the transmission fluid.

In realizing these objects and advantages, in a an automatic transmission having a hydraulic valve that controls operation of a friction element a magnet fixed to a displaceable valve spool, a sensor producing a signal responsive to the sensed intensity of a field produced by the magnet representing the position of the spool in the valve, the method of this invention includes the steps of producing from the signal a time series record of the position of the spool; determining the desired spool position; determining a spool position error from the current spool position and desired spool position; determining a compensated spool position from said spool position error; determining a current commanded control pressure from said compensated spool position and a prior commanded control pressure; changing the magnitude of control pressure applied to the valve in response to said current commanded control pressure; and changing the position of the spool in response to the current control pressure resulting from the current commanded control pressure.

BRIEF DESCRIPTION OF THE DRAWING

FIG. 6 is a schematic diagram of a system for producing a control pressure signal that controls the position of a valve spool.

DESCRIPTION OF THE PREFERRED EMBODIMENT

Figure 1:
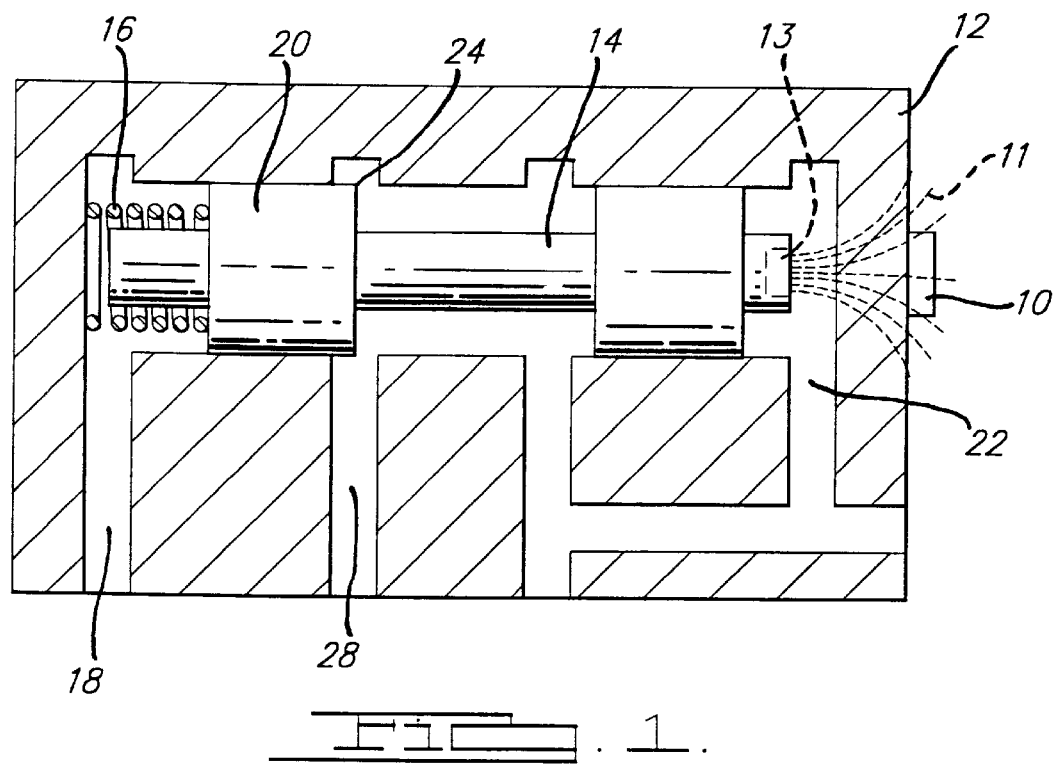
FIG. 1 is a cross section through a valve body showing a pressure control valve located in a bore for supplying hydraulic fluid to a friction element of an automatic transmission.

Referring first to FIG. 1, a sensor 10, an inexpensive semiconductor linear magnetic field strength sensor of either the Hall-effect or GMR type, senses the strength of a magnetic field 11 through a magnetically permeable valve body 12, the magnetic field being generated by a permanent magnet 13, located in a pocket or recess at the end of the valve spool 14 adjacent the sensor 10.

Preferably the valve body is of aluminum alloy, the sensor is a linear Hall-effect sensor available commercially as Part Number 3515L from Allegro MicroSystems, Inc. of Worcester, Mass., and the magnet is a Neodymium Iron Boron (NdFeB) and Samarium (SmCo) magnet available commercially from Magnet Sales & Manufacturing Inc. of Culver City, Calif.

The spool is held in a closed position by the total control force applied to the spool, the sum of the force of return spring 16 and the hydraulic pressure force acting on control land 20 due to control pressure supplied to the valve bore through port 18. When a reaction force caused by line pressure in port 22 equals or exceeds the total control force, the valve starts moving leftward from its closed position where the right-hand end of the spool abuts the valve body. Valve displacement is directly related to the width of a fluid flow path opening between the control edge 24 of land 20 and the edge of exhaust port 28. As exhaust port 28 opens, line pressure in port 22 reduces to balance the total control force. Line pressure is controlled by varying the control pressure.

The magnitude of the magnetic field strength sensed by sensor 10 varies approximately in proportion to the square of valve displacement. The signal produced by the sensor 10 is compatible with analog input circuits in controllers and can be digitized to produce a digital signal indicative of valve position. By proper interpretation of this signal, a control program can determine the exact time when the valve opens and the degree to which it opens. Further interpretation of this signal can show the effects of wear, valve sticking, or presence of debris particles.

Figure 2:
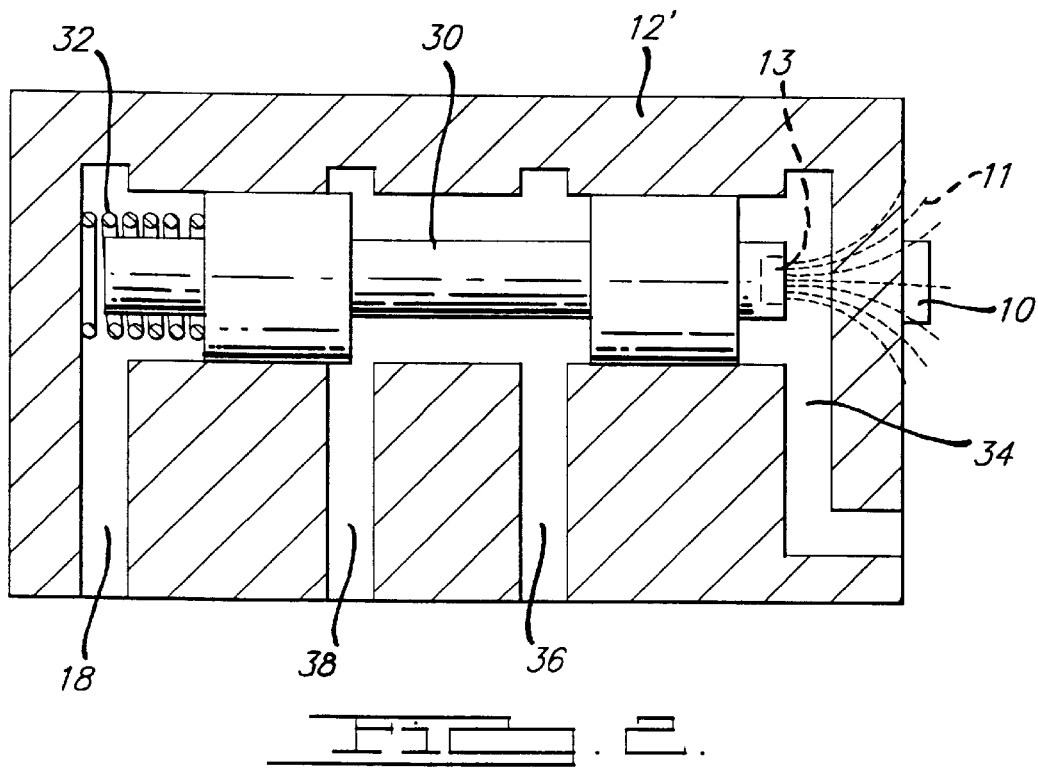
FIG. 2 is a cross section through a valve body showing a flow regulator valve located in a bore for supplying fluid to a friction element of an automatic transmission.

FIG. 2 shows the elements of a flow regulator valve adapted for use with this invention, the valve being partially displaced from the closed position. Sensor 10 and magnet 13 are attached in the same way as described for the pressure regulator valve of FIG. 1. Spool 30 is held in a closed position by return spring 32. When the reaction force caused by control pressure supplied through port 34 equals or exceeds the force of spring 32, the valve spool begins to move leftward from the closed position and uncovers a fluid flow path opening between the control edge of the land and the right-hand edge of port 38. Valve displacement is directly related to the width of the opening and controls the flow rate of pressurized fluid, supplied to the valve through port 36 and delivered through port 34 to an apply piston of a friction element, such as a clutch or brake of a step-change automatic transmission, or to a variator piston of a continuously variable transmission CVT. The valve position is determined in the same way as described above for the pressure regulator valve.

Figure 3:
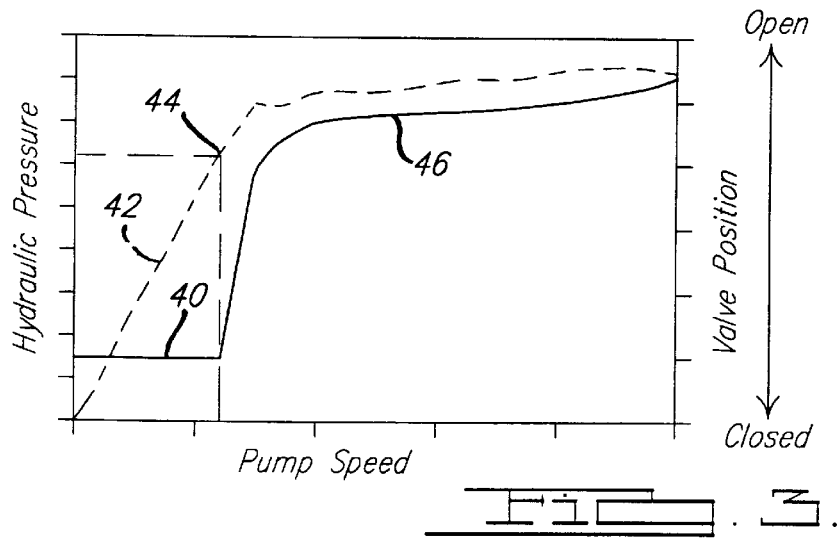
FIGS. 3 and 4 show test data for a main pressure regulator valve relating hydraulic line pressure and valve spool position as measured according to this invention.
Figure 4:
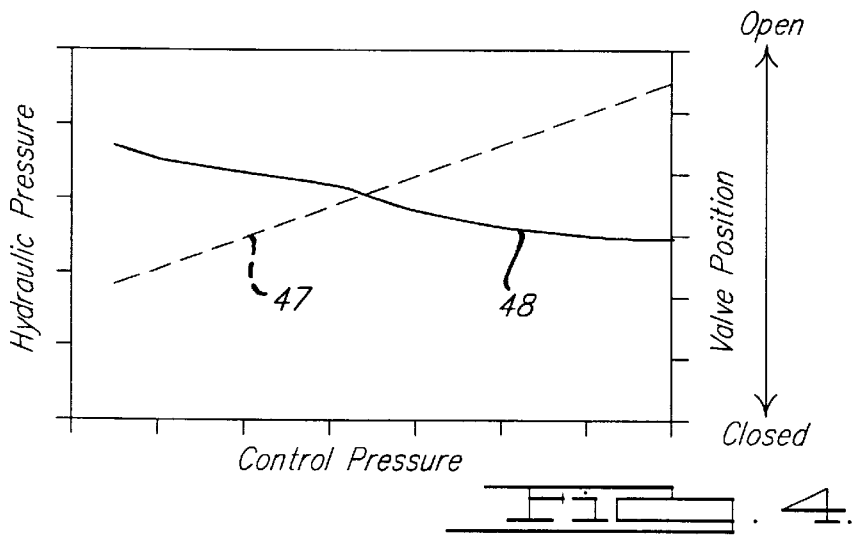

FIGS. 3 and 4 show test data representing line pressure and valve position, determined by the technique of this invention, for a pressure regulator valve. As FIG. 3 shows, main line pressure is regulated at about a magnitude of 160 psi while oil flow, represented by the constant-displacement-pump speed, increases. Control pressure is kept constant at about 40 psi. The valve is initially closed 40 at low pump speed. As pump speed increases, oil flow pressurizes the valve body and line pressure increases 42. When line pressure reaches approximately 125 psi 44, the valve spool begins to move leftward from the closed position. This movement opens a flow path to exhaust port 28, thereby regulating line pressure. As the pump speed continues to increase, the valve opens further at 46 to exhaust port 28, thereby maintaining line pressure at about 160 psi.

As FIG. 4 shows, control pressure varies from 5 to 70 psi to regulate line pressure. Flow into the valve body is kept constant by constant pump speed. The spool position data, derived from the magnitude of the magnetic field as explained below, shows the relation between valve position 48 and line pressure 47. As control pressure increases, the control force increases and pushes the valve toward the closed position and restricts exhaust flow, which causes an increase in line pressure.

A continuous analog voltage representing the position of spool 14 or 30 in the valve bore is produced by sensor 10 in response to the magnitude at the sensor of the magnetic field produced by magnet 13. That voltage signal is periodically sampled and digitized by a powertrain control module. The resulting signal, after being transformed through use of a table lookup, comprises a time series history of valve position $$\text{valve position } X(k) = F(\text{analog-to-digital } v(t)), \quad (1)$$

wherein F( ) is implemented as a table lookup.

Given the signal described in equation (1), the powertrain control module approximates the velocity and acceleration of the valve spool by numeric differentiation of the time series:

$$\text{valve velocity } Xdot(k) = (X(k) - X(k-1))/T \quad (2)$$

$$\text{valve acceleration } Xddot(k) = (Xdot(k) - Xdot(k-1))/T, \quad (3)$$

wherein T is the controller sampling time.

Using the signals described in equations (2) and (3), the powertrain control module determines when a pressure regulating valve or flow control valve is sticking or oscillating by continuously comparing the current valve spool velocity Xdot(k) and current valve spool acceleration Xddot(k) against a predetermined profile or trace of valve velocity and acceleration, preferably stored in an electronic database accessible to a microprocessor of the control module.

Figure 5:
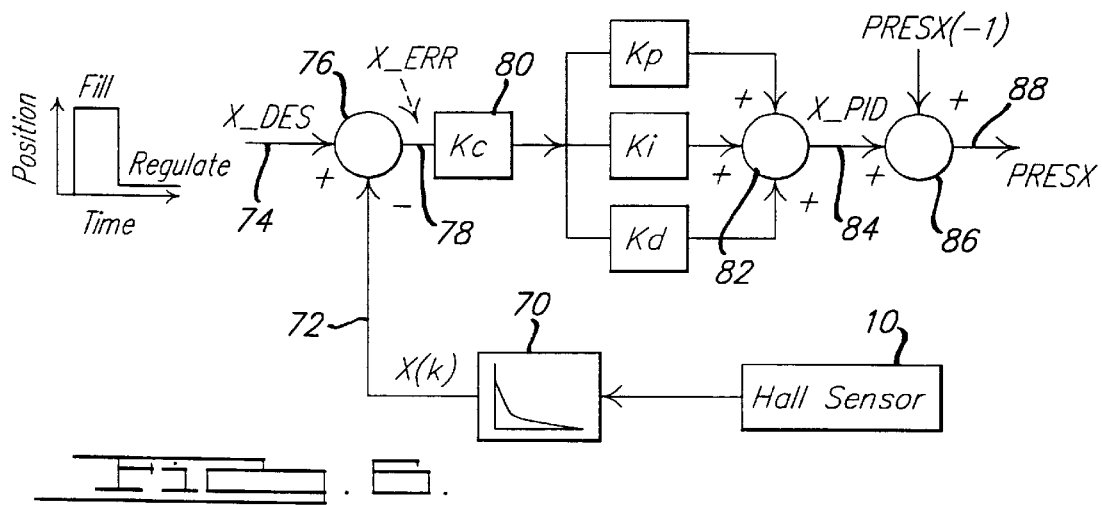
FIG. 5 is a graph of valve spool position vs. time or control pressure. Traces of spool velocity and acceleration during normal operation, oscillation and stiction events are shown.

For example, reference traces of valve spool velocity and acceleration during normal valve operation are represented in FIG. 5 at 50 and 52, respectively. A reference magnitude 54 associated with normal valve operation is stored in a database for comparison to corresponding data derived from current operation. If the valve sticks, traces of displacement, velocity and acceleration are zero. However, reference traces of valve spool velocity and acceleration at the end of a valve stiction event represented in FIG. 5 at 56 and 58, respectively, show abrupt changes in spool velocity and acceleration. Reference traces of valve spool velocity and acceleration during a valve oscillation event are represented in FIG. 5 at 60 and 62, respectively. A reference magnitude 64 associated with the oscillation event is stored in a database for comparison to corresponding data derived from current operation. Whenever a reference magnitude corresponding to these events is reached or exceeded by current magnitudes, a warning indication perceptible to the vehicle operator is produced.

FIG. 8 shows schematically a system for controlling a valve using the signal produced by the valves described above with reference to FIGS. 1 and 2. The voltage signal produced by sensor 10 is converted by look-up table 70 to a digital count carried on line 72 representing the current valve position relative to a reference position.

Using the valve spool position signal described with reference to equation (1), the powertrain control system determines exactly when a flow control valve begins to admit fluid to the friction element cylinder or vent fluid by comparing valve position X(k) to a stored threshold position. If the time to fill the cylinder of the friction element with fluid is not as desired, the performance of a pressure control valve can be improved by modulating the control pressure with closed loop feedback of the pressure control valve position X(k), especially while the friction element is being filled with fluid and being vented.

For example, as represented in FIG. 8, the control determines the desired spool position from a predetermined schedule of position and time corresponding to the period during which the friction element piston is being filled with fluid and the period thereafter during which fluid pressure in the friction element is regulated. During the fill process, the control pressure is increased until the desired valve spool position XDES is attained. XDES is carried on line 74 to junction 76. As the cylinder of the friction element fills, control pressure reverts to the desired regulation value. This change of valve position results in response to an electronic command signal PRESX applied to a solenoid-operated valve that changes the magnitude of control pressure.

The signals on lines 72 and 74 are combined at summing junction 76, where an error signal XERR is produced and carried on line 78 to compensation gain or amplification gain 80. Next an incremental PID compensator produces corresponding proportional, differential and integral compensation to junction 82, which produces a correction error XPID carried on line 84. The command signal produced at the immediately prior sampling interval PRESX(-1) is combined with XPID at junction 86, which produces the control pressure command signal PRESX, carried on line 88 to the solenoid, the signal producing the commanded magnitude of control pressure in response to PRESX. At the start of a gear ratio change that requires filling and pressurizing the cylinder of an on-coming friction element for which there is no prior commanded control pressure, preferably PRESX(-1) should represent the commanded control pressure corresponding to the desired valve position. In this way the valve position changes in response to the commanded control pressure to produce the desired position.

The sensing method of this invention is noninvasive, easily packaged, and takes advantage of magnetic permeability of typical automatic transmission hydraulic valve body to sense internal valve movement from outside the valve body. A direct relationship of sensor signal to valve oscillation provides information regarding hydraulic pressure oscillation, and of oil flow rate into a friction element piston or a CVT variator piston. Direct indication of the valve motion provides improved hydraulic pressure and flow management for improved shift quality. Valve motion provides information to the automatic transmission control strategy applicable to failure mode detection and management.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A method for controlling operation of an automatic transmission having a hydraulic valve that controls operation of a friction element, having a magnet fixed to a displaceable valve spool, a sensor producing a signal responsive to the sensed intensity of a field produced by the magnet representing the position of the spool in the valve, the method comprising the steps of:

produring from the signal a time series record of the position of the spool;

determining the desired spool position;

determining a spool position error from the current spool position and desired spool position;

determining a compensated spool position from said spool position error;

determining a current commanded control pressure from said compensated spool position and a prior commanded control pressure;

changing the magnitude of control pressure applied to the valve in response to said current commanded control pressure; and changing the position of the spool in response to the current control pressure.

2. The method of claim 1, further comprising:

determining from said time series record of the position of the spool, the current spool velocity and acceleration;

continually comparing predetermined magnitudes of spool velocity corresponding to a valve stiction event to said current spool velocity;

continually comparing of spool acceleration corresponding to a valve stiction event to current spool acceleration; and producing a warning indicating the presence of a valve stiction event whenever said current spool velocity or current spool acceleration exceeds the corresponding predetermined magnitude.

3. The method of claim 1, further comprising:

determining from said time series record of the position of the spool, the current spool velocity and acceleration;

continually comparing predetermined magnitudes of spool velocity corresponding to a valve oscillation event to said current spool velocity;

continually comparing of spool acceleration corresponding to a valve oscillation event to current spool acceleration; and producing a warning indicating the presence of a valve oscillation event whenever said current spool velocity or current spool acceleration exceeds the corresponding predetermined magnitude.

4. A method for controlling operation of an automatic transmission having a hydraulic valve that controls a first period during which a friction element is being filled with fluid and regulates fluid pressure in the friction element, having a magnet fixed to a displaceable valve spool, a sensor producing a signal responsive to the sensed intensity of a field produced by the magnet representing the position of the spool in the valve, the method comprising the steps of:

producing from the signal a time series record of the position of the spool;

following a command to engage the friction element, continually comparing the length of said first period and the desired length of said period;

determining a first desired spool position corresponding to said period;

determining a spool position error from a current spool position and a first desired spool position;

determining a compensated spool position from said spool position error;

determining a current commanded control pressure from said compensated spool position and a prior commanded control pressure;

changing the magnitude of control pressure applied to the valve in response to said current commanded control pressure; and changing the position of the spool in response to the current control pressure.

5. The method of claim 4, further comprising:

following expiration of said period, determining magnitudes of second desired spool position during a second period in which the pressure in the friction element is being regulated;

determining a spool position error from a current spool position and a second desired spool position;

determining a compensated spool position from said spool position error;

determining a current commanded control pressure from said compensated spool position and a prior commanded control pressure;

changing the magnitude of control pressure applied to the valve in response to said current commanded control pressure; and changing the position of the spool in response to the current control pressure resulting from the current commanded control pressure.

6. The method of claim 4, further comprising:

determining from said time series record of the position of the spool, the current spool velocity and acceleration;

continually comparing predetermined magnitudes of spool velocity corresponding to a valve stiction event to said current spool velocity;

continually comparing of spool acceleration corresponding to a valve stiction event to current spool acceleration; and producing a warning indicating the presence of a valve stiction event whenever said current spool velocity or current spool acceleration exceeds the corresponding predetermined magnitude.

7. The method of claim 4, further comprising:

determining from said time series record of the position of the spool, the current spool velocity and acceleration;

continually comparing predetermined magnitudes of spool velocity corresponding to a valve oscillation event to said current spool velocity;

continually comparing of spool acceleration corresponding to a valve oscillation event to current spool acceleration; and producing a warning indicating the presence of a valve oscillation event whenever said current spool velocity or current spool acceleration exceeds the corresponding predetermined magnitude.

* * * * *